United States Patent [19]

Kouyama

[11] Patent Number: 4,593,392

[45] Date of Patent: Jun. 3, 1986

[54] ERROR CORRECTION CIRCUIT FOR DIGITAL AUDIO SIGNAL

[75] Inventor: Toshitake Kouyama, Tokyo, Japan

[73] Assignee: NEC Corporation, Tokyo, Japan

[21] Appl. No.: 527,708

[22] Filed: Aug. 29, 1983

[30] Foreign Application Priority Data

Aug. 27, 1982 [JP] Japan .................. 57-148986

[51] Int. Cl.⁴ .................. H04N 5/76; G06F 11/00
[52] U.S. Cl. .................. 371/31; 360/38.1; 358/314; 358/336; 371/65
[58] Field of Search .................. 371/31, 65; 360/38.1; 358/314, 336

[56] References Cited

U.S. PATENT DOCUMENTS

| | | | |
|---|---|---|---|
| 3,569,934 | 3/1971 | Parr, Jr. ........................ | 371/31 |
| 4,202,018 | 5/1980 | Stockham, Jr. ................ | 371/31 X |
| 4,376,290 | 3/1983 | Shirota .......................... | 358/314 |
| 4,430,736 | 2/1984 | Scholz ........................... | 371/31 |
| 4,451,921 | 5/1984 | Odaka ............................ | 371/31 X |
| 4,462,048 | 7/1984 | Ross .............................. | 358/336 |

*Primary Examiner*—Charles E. Atkinson
*Attorney, Agent, or Firm*—Sughrue, Mion, Zinn, MacPeak and Seas

[57] ABSTRACT

In an error correction circuit of the type in which a received audio signal is passed to the error correction output when no error is detected and wherein a substitute signal, e.g. either a previous value of the received audio signal or a muting signal, is provided to the error correction circuit output when an error is detected in the received audio signal, complementary gain control circuits are employed to gradually fade in the newly selected signal while gradually fading out the previously selected signal to eliminate undesirable clicking noise.

9 Claims, 12 Drawing Figures

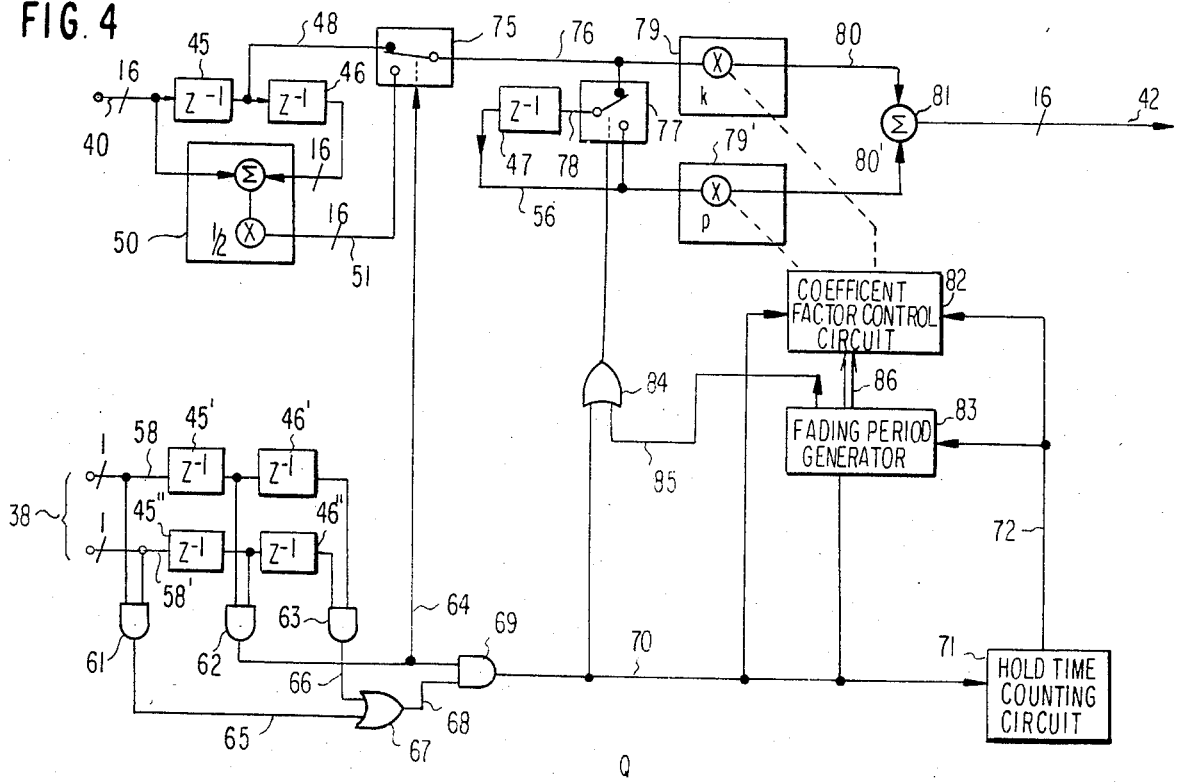
FIG. 4
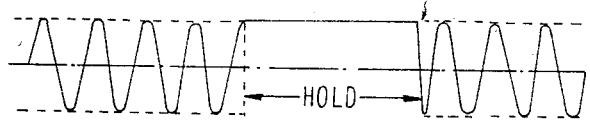
FIG. 5(a)
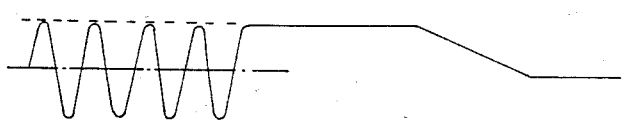
FIG. 5(b)
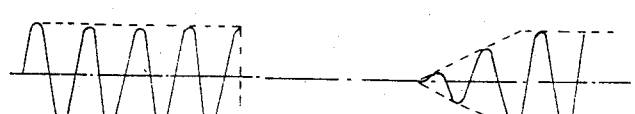
FIG. 5(c)
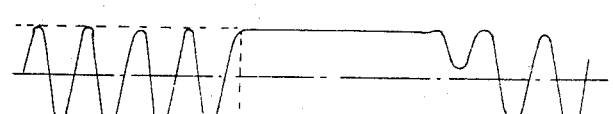
FIG. 5(d)
FIG. 5(e)
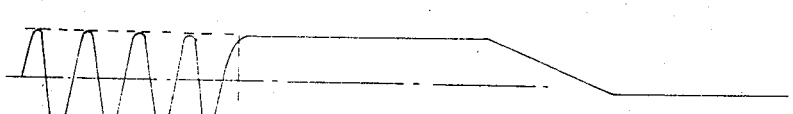
FIG. 5(f)
FIG. 5(g)

ERROR CORRECTION CIRCUIT FOR DIGITAL AUDIO SIGNAL

BACKGROUND OF THE INVENTION

This invention relates to a digital audio signal error correction circuit, and more particularly to an error correction circuit for a digital audio signal that is reproduced by a tape recording/reproducing apparatus.

In a digital video tape recording/reproducing apparatus (VTR), video and audio signals are converted into digital signals and then recorded on a magnetic tape. In particular, the audio signal is converted into PCM data, and, after the time axis of the PCM data is compressed, a parity code for subsequent error detection is added. The time-compressed audio data is then inserted into the vertical blanking period and is thereafter recorded. In this case, the same audio data is recorded twice in order to ensure a higher-fidelity reproduction, even if one of the audio data is not reproduced due to drop out. If at least one data of the twice recorded data is reproduced completely during the reproduction, the audio data can be reproduced without error. When both recorded data are not reproduced due to drop out in a certain short time period, data corresponding to the lost data is produced by interpolation if two data before and after the drop out portion are normally reproduced. When twice recorded data are lost for a long period, a preceding data is held, and when the loss of the data lasts further, a mute state is provided.

A prior art error correction circuit has the problem that if there is a large difference in level between newly reproduced data and the held data or the muting data, an offensive click noise is produced when the data-holding state or the muting state returns to the normal state.

SUMMARY OF THE INVENTION

It is therefore an object of the present invention to provide an error correction circuit for a digital audio signal which does not generate an offensive click noise when the data-holding state or muting state described above returns to the normal state.

In accordance with the present invention, there is provided an error correction for a digital audio signal comprising means for generating a cross-fade state, in which a previous held data is faded-out and a new normal data is faded-in when a state of holding the previous data or a muting state returns back to the normal state.

BRIEF DESCRIPTION OF THE DRAWINGS

FIG. 4 shows a block diagram of an embodiment according to the present invention;

FIG. 5(a) is a waveform for explaining prior art error correction; and

FIGS. 5(b), 5(c), 5(d), 5(e), 5(f) and 5(g) are waveforms for explaining error correction according to the present invention.

DESCRIPTION OF THE PREFERRED EMBODIMENT

Figure 1:
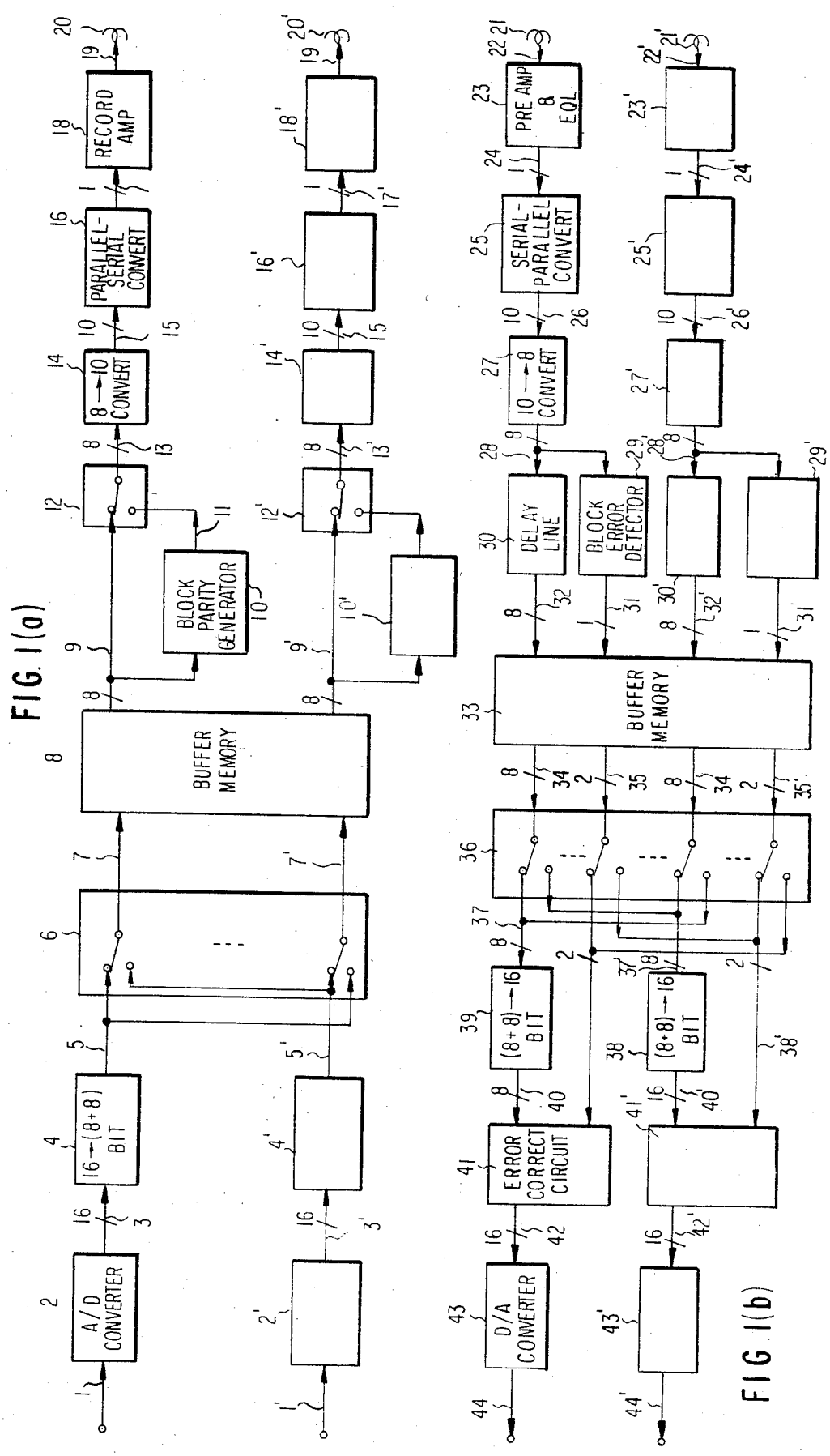
FIG. 1(a) is a block diagram of an audio system on a recording side of a digital VTR.
FIG. 1(b) is a block diagram of an audio system on the reproduction side of the digital VTR.

In order to make the principle of the present invention more easily understood, the recording system and the reproduction system of a digital VTR will first be explained with reference to FIGS. 1(a) and 1(b). First, the recording system will be explained. In FIG. 1(a), two-channel analog audio signals 1 and 1' are converted into parallel PCM data 3 and 3', which are sampled at 44.056 KHz and quantized by 16 bits, in A/D converters 2 and 2'.

On the other hand, a video signal is coded into a parallel PCM 8 bit data. Since the PCM video data and the PCM audio data should be processed through a common data bus, the 16-bit PCM audio data 3 and 3' are respectively converted by bit converters 4 and 4' into data 5 and 5' which respectively consist of two groups of 8 bits (1 byte), i.e., 8 bits each signal 5 and 5' consists of a first of data from the most significant bit (MSB) and a second 8 bits of data from the least significant bit (LSB). The two audio data 5 and 5' corresponding to two channels are alternatively interchanged and combined for each 16 bit data (1 word) in a interleave circuit 6. The alternatively combined audio data 7 and 7' are supplied to a buffer memory 8. In the buffer memory 8, the audio data 7 and 7' corresponding to one field are compressed in a time axis in order to be recorded in the vertical blanking period. Further, the same time compressed audio data 9 and 9' of one field are delivered twice from the buffer memory for double-recording. For example, the same time compressed audio data is separately recorded on opposite edges of a video track on a magnetic tape. Hereinafter, the explanation will concern only one channel.

A Reed-Solomon inspection code 11 of 4 bytes is produced in a block parity generator 10 for each 96 bytes (48 words) of data 9, and is added to the data 9 by means of a selector 12. As a result, 16 audio data blocks each consisting of a total of 100 bytes are delivered from the selector 12 during one field period. Each unit of parallel 8-bit data in the output 13 from the selector 12 is converted into a unit of 10-bit data 15 by an 8/10 bit converter 14, and the parallel data 15 from the converter 14 is converted into a serial data 17 by a parallel/serial converter 16. The serial data 17 from the converter 16 is modified by a recording amplifier 18, and the output 19 of the amplifier 18 is recorded on the magnetic tape through a recording head 20.

The reproduction operation will now be explained with reference to FIG. 1(b). This description also only deals with one channel.

A time compressed audio data signal 22 is picked up from the magnetic tape by a reproducing head 21 and then processed in the reverse manner of the recording side shown in FIG. 1(a) through an equalizing amplifier 23, a serial/ parallel converter 25 and a 10/8 bit converter 27. The parallel 8 bit data 28 delivered from the 10/8 bit converter 27 is supplied to a block error detector 29 and a delay line 30. The block error detector 29 detects whether or not each block (100 bytes) contains an error by checking the Reed-Solomon inspection code of 4 bytes contained in each block. When an error is detected, the block error detector delivers an error pointer signal 31 of a high logic level. Since the generation timing of the error pointer signal 31 is delayed one block period with respect to the data 28, a delay line 30 is provided so as to match the output data 32 with the error pointer signal 31. Since the same time compressed audio data is double recorded, the compressed audio data 32 and the error pointer signals 31 are supplied twice to a buffer memory 33.

In the buffer memory 33, the time-compressed audio data 32 delivered from the delay line 30 is written when the error pointer signal 31 has a low logic level, i.e., there is no error. When the error pointer signal has the high logic level, the writing operation is inhibited. The error pointer signal 31 is also stored in the buffer memory 33. In particular, two time-compressed audio data containing the same information are written into the same memory area and two error pointer signals are written in different two memory areas. Therefore, the buffer memory 33 has a capacity for storing the audio data corresponding to one field and the error pointer signals corresponding to two fields.

With respect to the audio data storage of each block in the buffer memory 33, the following three cases can occur. First, two error pointer signals corresponding to the same audio data both have the low logic level, i.e., two audio data each have no error (case 1). Second, one of two error pointer signals has a high logic level (case 2). Third, two error pointer signals both have a high logic level (case 3). Except in the case 3, the buffer memory 33 can store the correct audio data.

From the buffer memory 33, the time-expanded audio data 34 and a pair 35 of the error pointer signals are simultaneously read out and delivered to a de-interleave circuit 36. In the de-interleave circuit 36, the audio data 34 and 34' and the 2 bit error pointer signals 35 and 35' corresponding to each word (16 bit) are interchanged in order to reproduce two respective audio data 37 and 37' of channels 1 and 2 and the 2 bit error pointer signals 38 and 38'. The audio data 37 of parallel 8 bits is converted to the original audio data 40 of parallel 16 bits by a bit-converter 39. The original audio data 40 and the 2 bit error pointer signals are supplied to an error correction circuit 41 where an error contained in the audio data 40 is compensated in accordance with the error pointer signals. The error-corrected audio data 42 delivered from the error correction circuit 41 is converted to an analog audio signal 44 of the channel 1 by a D/A converter 43.

A prior art error correction circuit which corresponds to the block 41 shown in FIG. 1(b) will now be explained with reference to FIGS. 2 and 3.

Figure 3:
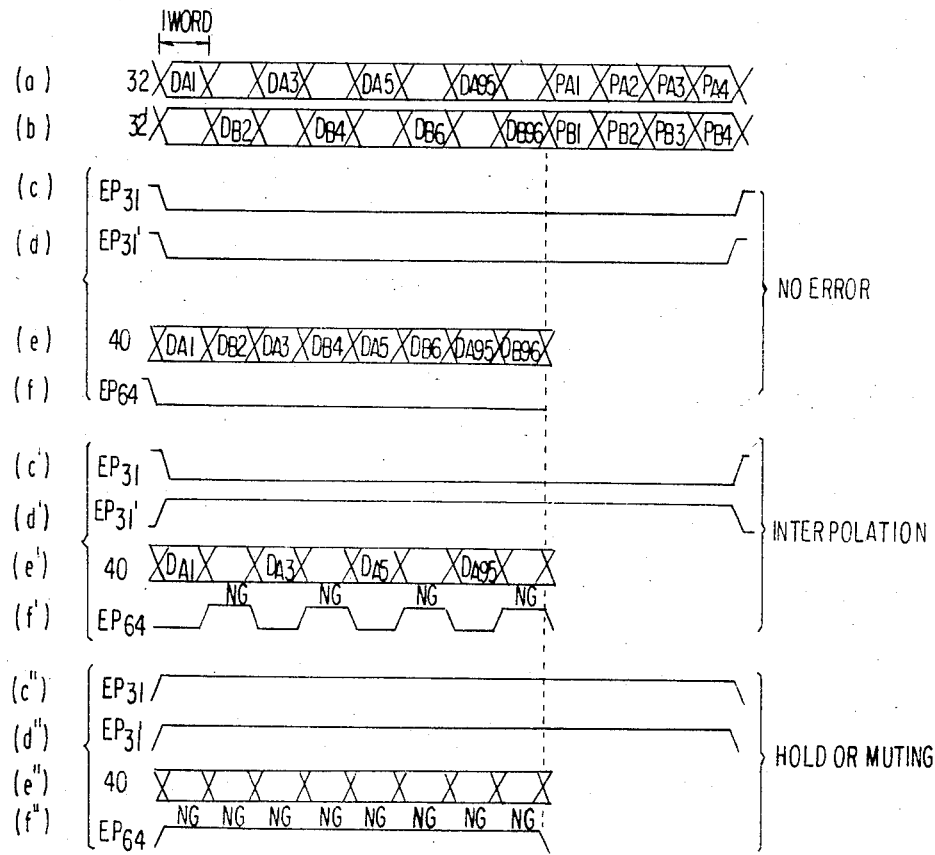
FIG. 3 shows data alignments and error pointer signals corresponding to one block.

Referring first to FIG. 3 which shows data alignments and error pointer signals corresponding to one block, data alignments (a) and (b) indicate the audio data 32 and 32', respeotively. The data alignments $D_{A1}$, $D_{A3}$, ..., $D_{A95}$ and $D_{B2}$, $D_{B4}$, ... $D_{B96}$ are interleaved data of one audio channel, for example, the channel 1. Therefore, blank portions in the data alignments correspond to the interleaved data of the other channel 2. Data alignments $P_{A1}$ to $P_{A4}$ and $P_{B1}$ to $P_{B4}$ indicate the Reed-Solomon inspection codes added to the audio data of 96 bytes. Signals (c) and (d) show the error pointer signals 31 and 31', respectively. Another data alignment (e) shows audio data 40 which is de-interleaved in the de-interleaving circuit 36. A signal (f) shows an error pointer signal corresponding to the de-interleaved data 40. With respect to the signals (c), (d), (f) and the data alignment (e), the time-axes are expanded. However, in FIG. 3, the point of the time-expansion is neglected.

Figure 2:
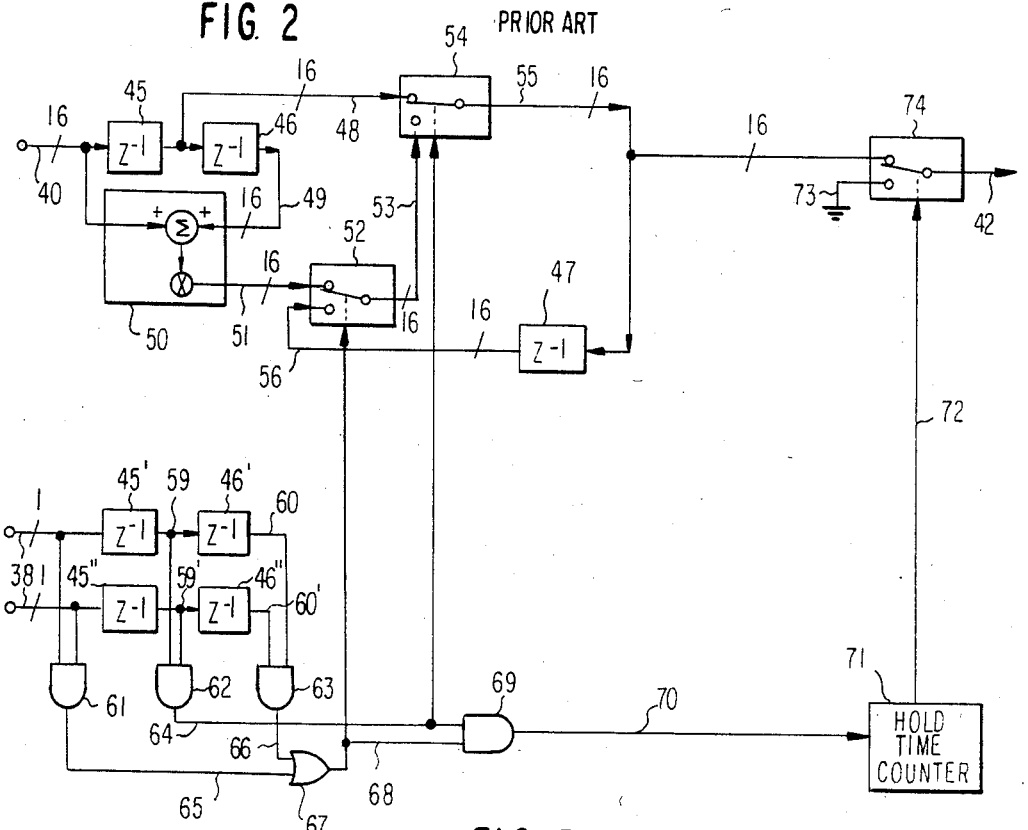
FIG. 2 shows a block diagram of a prior art error-correction circuit for a digital audio signal.

Referring to FIG. 2, the 16 bit parallel data 40 is supplied to a series of shift registers 45 and 46. A primary interpolation circuit 50 produces an averaged data from the data 40 and 49 which are before and after one word. A register 47 holds a previous data 55. A selector 52 selects one data between the interpolated data 51 delivered from the interpolation circuit 50 and the held data 56 delivered from the register 47. A selector 54 selects one data between the data 48 from the register 45 and the data 53 from the selector 52. A selector 74 selects one data between the data 55 from the selector 54 and a muting data 73. On the other hand, the 2 bit error pointer signals are supplied to a series of registers 45' and 46' and a series of registers 45" and 46". All of the registers described above are driven by the sampling frequency.

When at least one of the error pointer signals 59 and 59' has a low logic level, an error pointer signal 64 delivered from an AND gate 62 is low, and the audio data 48 from the register 45 which is normal data without an error is transmitted through the selectors 54 and 74 to the D/A converter 43 (FIG. 1(b)). When both error pointer signals 59 and 59' have high logic level, the error pointer signal 64 is high, and the audio data 48 from the register 45 which is erroneous is prevented from going forward. The selector 54 selects the data 53 delivered from the selector 52. At this time, if both error pointer signals 65 and 66 delivered from gates 61 and 63 are low, the interpolated data 51 delivered from the interpolation circuit 50 is applied by the selector 52 to the selector 54. Therefore, the interpolated data 51 is transmitted through the selectors 52, 54 and 74 to the external. If the error pointer signal 64 is high and at least one of the error pointer signals 65 and 66 is high, the interpolated data 51 is prevented and the data 56 which has been held by the register 47 is transmitted through the selectors 52, 54 and 74 to the external. Furthermore, a hold time counting circuit 71 detects a period of time during which the held data 56 continues to be transmitted to the external, and the held data 56 to be transmitted to the external is switched over to the muting data 73 when the period detected by the held time counting circuit 71 exceeds a predetermined value.

FIG. 5(a) indicates operation of the prior art error correction circuit shown in FIG. 2. When the held data or the muting data is switched over to a newly reproduced audio data which is free from an error, an extremely offensive click noise occurs at a point Q if the value of the newly reproduced audio data is different from that of the previously held data or the muting data, as shown in FIG. 5(a).

An embodiment of the present invention will now be described in detail with reference to FIG. 4 which shows the block of the error correction circuit 41 shown in FIG. 1(b).

Referring to FIG. 4, a selector 75 selects either one of the data 48 delivered from the register 45 and the data 51 delivered from the interpolation circuit 50. These data 48 and 51 are produced by the same circuit as in FIG. 2. A register 47 holds a previous data 78. Another selector 77 selects either one of the data 76 delivered from the selector 75 and the previously held data 56 delivered from the register 47. A coefficient circuit 79 controls the value of the data 76 from the selector 75 and another coefficient circuit 79' controls the value of the data 56 from the register 47. An adder 81 adds two data 80 and 80' from the coefficient circuits 79 and 79' and delivers the added data 42 to the external, i.e., the D/A converter 43 (FIG. 1(b)). With respect to the treatment of the 2 bit error pointer signals 38, the same circuit configuration as shown in FIG. 2 is employed to produce the signals 64, 65, 66, 68 and 70.

When the error pointer signal 64 delivered from the gate 62 has a low logic level, the data 48 delivered from the register 45 is selected by the selector 75 and is transmitted externally through the coefficient circuit 79 having a coefficient factor "1" and through the adder 81 with the other input 80' being zero. When the error pointer signal 64 has a high logic level and both error pointer signals 65 and 66 delivered from the gates 61 and 63 have low logic levels, the interpolated data 51 is selected by the selector 75 and transmitted externally through the coefficient circuit 79 with a coefficient "1" and through the adder 81 with the other input 80' "0".

A signal 70 delivered from an AND gate 69 rises to a high logic level when the error pointer signal 64 has a high logic level and at least one of the error pointer signals 65 and 66 has a high logic level. At this time, the selector 77 selects the previously held data 56 and a coefficient factor control circuit 82 changes coefficient factors k and p in the coefficient circuits 79 and 79' to "0" and "1", respectively. As a result, the previously held data 56 is transmitted externally the adder 81. When new data 40 which is free from an error is supplied, the signal 70 from the gate 69 returns to the low logic level, and the previously held data 56 is faded out by the coefficient circuit 79', while the new data is transmitted via the register 45 and the selector 75 to the coefficient circuit 79. In the present invention, this new data is faded in by the coefficient circuit 79 and added to the adder 81 to which the previously held, faded-out data 56 is also added, in order to prevent the offensive click noise. To this end, the coefficient factors k and p of the coefficient circuits 79 and 79' are gradually shifted from "0" to "1" and from "1" to "0", respectively, under the control of a coefficient factor control circuit 82. A fading period generator 83 delivers a pulse signal 85 of a predetermined fading period, for example, for 4 ms to the selector 77 through an OR gate 84 when the signal 70 from the gate 69 turns to the low logic level from the high logic level. During this period, the selector 77 continues to select the previous held data 56 delivered from the register 47. Therefore, the audio data 80 delivered from the coefficient circuit 79 is subjected to the fade-in operation as shown in FIG. 5(c), and the audio data 80' from the coefficient circuit 79' is subjected to the fade-out operation as shown in FIG. 5(b). As a result, the added audio data 42 delivered from the adder 81 becomes cross-faded as shown in FIG. 5(d).

When the period during which the signal 70 from the gate 69 is kept at the high logic level exceeds a predetermined period, a hold time counting circuit 71 delivers a muting signal 72 to the coefficient factor control circuit 82 and the fading period generator 83. In response to the muting signal 72, the fading period generator 83 also delivers the control data 86. The coefficient factor control circuit 82 changes the coefficient factor p of the coefficient circuit 79' from "1" gradually to "0" in accordance with the control data 86. In this case, the coefficient factor of the coefficient circuit 79 is kept "0" by means of the muting signal 72. Therefore, the data 80' from the coefficient circuit 79' varies gradually to zero, i.e., is faded out, as shown in FIG. 5(e).

When a new normal data free from error is supplied under the above-mentioned muting condition, the signal 70 becomes low and the muting condition is released. At this time, the fading period generator 83 delivers the control data 86, and the coefficient factor k of the coefficient circuit 79 is changed gradually from "0" to "1". In this case, the coefficient factor p of the coefficient circuit 79' is kept "0" under the condition of the disappearance of the muting signal 72. Therefore, the audio data 80 delivered from the coefficient circuit 79 is gradually increased, as shown in FIG. 5(f). As a result, the audio data 42 delivered from the adder 81 is faded in after the muting condition, as shown in FIG. 5(g).

As described above, the present invention is capable of eliminating the offensive click noise when the audio data is switched over from the previously held data or the muting data to the new normal audio data.

What is claimed is:

1. A digital signal error correction circuit of the type for receiving a digital audio signal, determining if an error exists in said digital audio signal and passing said digital audio signal to an error correction circuit output when no error is indicated while providing an alternative signal to said error correction circuit output when an error is indicated, said error correction circuit further comprising:
   gain control means, responsive to a change in the provision of either said digital audio signal or said alternative signal to said error correction circuit output, for gradually increasing the gain of the newly provided signal at said error correction circuit output.

2. A digital signal error correction circuit of the type having means for receiving a digital audio signal, means for determining if an error exists in said digital audio signal and for providing a control signal having a first state when no error is determined and a second state when an error is determined, and selection means responsive to said first state of said control signal for providing said digital audio signal as an error correction circuit output and responsive to said second state of said control signal for providing said alternative signal as said error correction circuit output, said selection means comprising:
   gain control means, responsive to a change in said control signal from one of said first and second states to the other of said first and second states, for gradually increasing the gain at said error correction circuit output of that one of the digital audio and alternative signals which is to be provided as said error correction output by said selection means in response to said other state of said control signal.

3. A digital signal error correction circuit as claimed in claim 2, wherein said gain control means further gradually decreases the gain at said error correction circuit output of the remaining one of said digital audio and alternative signals which , has previously been provided as said error correction circuit output in response to said one of said first and second states of said control signal.

4. A digital signal error correction circuit as claimed in claim 2, wherein said gain control means comprises a first gain control circuit for controlling the gain of said digital audio signal in accordance with a first gain control signal;
   a second gain control circuit for controlling the gain of said alternative signal in accordance with a second gain control signal;
   coefficient factor control means for controlling said first and second gain control signals in accordance with at least said control signal; and combining means for receiving and combining outputs of said first and second gain control circuits to obtain said error correction circuit output.

5. A digital signal error correction circuit as claimed in claim 4, wherein said alternative signal comprises a previous value of said digital audio signal.

6. A digital signal error correction circuit as claimed in claim 4, wherein said gain control means further includes timing means for determining the time for which said alterantive signal has been provided as said error correction output and for providing a muting signal when said determined time exceeds a predetermined time interval, said coefficient factor control means being responsive to said muting signal for decreasing the gain of said second gain control circuit.

7. A digital audio error correction circuit for compensating an error contained in a train of incoming digital audio data, comprising:
 first receiving means for receiving said incoming digital audio data;
 second receiving means for receiving an error signal indicating the presence of the error in said incoming digital audio data;
 interpolation means coupled to said first receiving means for outputting a modified audio data by using at least two incoming digital audio data which are free from the error;
 selecting means coupled to said first receiving means, said second receiving means and said interpolation means for alternatively selecting said incoming digital audio data and said modified audio data to output a selected audio data, said modified audio data being selected in response to said error signal;
 means for transferring said selected audio data to an output terminal;
 means coupled to said selecting means for holding said selected audio data;
 means for transferring the output of said holding means to said output terminal when said error signal is received for a predetermined time;
 means for fading out the output of said holding means and fading in said selected audio data in response to disappearance of said error signal after it is received for said predetermined time;
 means for adding the faded-out output of said holding means and the faded-in selected audio data; and
 means coupled to said adding means and said output terminal for supplying the added output to said output terminal.

8. An error correction circuit comprising:
 a first means for receiving a digital data signal;
 a second means for receiving an error signal indicating presence or absence of an error in said digital data signal;
 a first delay means coupled to said first receiving means for delaying said digital data signal by a predetermined time;
 a second delay means coupled to said first delay means for delaying the delayed digital data signal by a predetermined time;
 an interpolation means for producing an averaged data between the input data of said first delay means and the output data of said second delay means;
 means for selecting one of the output of said first delay means and the output of said interpolation means;
 a first coefficient means coupled to said selecting means for producing a first output by multiplying the output of said selecting means and a first variable coefficient;
 a storing means coupled to said selecting means for storing the output of said selecting means;
 a second coefficient means coupled to said storing means for producing a second output by multiplying the stored output of said selecting means and a second variable coefficient;
 means coupled to said first and second coefficient means for adding said first and second outputs of said first and second coefficient means;
 means coupled to said second receiving means for controlling said selecting means such that the output of said first delay means is selected when said error signal indicates absence of the error and the output of said interpolation means is selected when said error signal indicates presence of the error;
 means coupled to said second receiving means and to said storing means for retaining the stored output of said selecting means when said error signal indicates presence of the error for a predetermined period of time; and
 means coupled to said second receiving means, to said first coefficient means and to said second coefficient means for controlling said first and second coefficients to be "1" and "0", respectively, when said error signal does not indicate the presence of the error for a predetermined period of time, to be "0" and "1", respectively, when said error signal indicates the presence of the error for a predetermined period of time, and to change to gradually increase and gradually decrease, respectively, in response to the change of said error signal turning to indicate absence of the error.

9. An error correction circuit as claimed in claim 8, further comprising means coupled to said second receiving means for changing said second coefficient from "1" to "0" when said error signal indicates the presence of the error for a period of time after said predetermined period of time has been elapsed.

* * * * *